(12) United States Patent
Satish

(10) Patent No.: US 8,307,453 B1
(45) Date of Patent: Nov. 6, 2012

(54) ZONE BREAKOUT DETECTION

(75) Inventor: Sourabh Satish, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 1434 days.

(21) Appl. No.: 11/000,534

(22) Filed: Nov. 29, 2004

(51) Int. Cl.
*G06F 12/14* (2006.01)
*G06F 12/16* (2006.01)
*G06F 11/00* (2006.01)
*G08B 21/00* (2006.01)
*G08B 23/00* (2006.01)

(52) U.S. Cl. .................. 726/27; 726/26; 718/1

(58) Field of Classification Search .................. 719/313; 718/1; 726/26, 27
See application file for complete search history.

(56) References Cited

U.S. PATENT DOCUMENTS

| | | | |
|---|---|---|---|
| 6,374,302 B1 * | 4/2002 | Galasso et al. | 709/238 |
| 6,996,716 B1 * | 2/2006 | Hsu | 713/175 |
| 7,103,914 B2 * | 9/2006 | Focke et al. | 726/22 |
| 7,337,445 B1 * | 2/2008 | Price et al. | 719/313 |
| 7,389,512 B2 * | 6/2008 | Tucker | 719/313 |
| 7,437,556 B2 * | 10/2008 | Tucker et al. | 713/164 |
| 7,461,080 B1 * | 12/2008 | Tucker | 1/1 |
| 7,526,774 B1 * | 4/2009 | Beck et al. | 719/320 |
| 2002/0120660 A1 * | 8/2002 | Hay et al. | 718/100 |
| 2003/0014466 A1 * | 1/2003 | Berger et al. | 709/102 |
| 2004/0226023 A1 * | 11/2004 | Tucker | 719/315 |
| 2005/0021788 A1 * | 1/2005 | Tucker et al. | 709/229 |
| 2005/0071472 A1 * | 3/2005 | Arndt et al. | 709/226 |

* cited by examiner

*Primary Examiner* — S. Sough
*Assistant Examiner* — Kimberly Jordan
(74) *Attorney, Agent, or Firm* — Wilmer Cutler Pickering Hale and Dorr LLP (57) ABSTRACT

Zone breakout detection is disclosed. A system call is monitored. It is determined if the system call stays within a zone in which a process associated with the system call was started. If it is determined the system call does not stay within the zone in which the process associated with the system call was started, appropriate action is taken.

21 Claims, 9 Drawing Sheets

| Zone 0 | Zone 1 | Zone 2 | Zone 3 |
|---|---|---|---|
| Process 1 | Process 4 | Process 2 | Process 5 |
| Process 3 | Process 7 | Process 6 | Process 8 |
| | | | |
| | | | |

FIG. 9

ZONE BREAKOUT DETECTION

FIELD OF THE INVENTION

The present invention relates generally to computer security systems. More specifically, detection of breakouts from virtual operating systems, or zones, to provide security is disclosed.

BACKGROUND OF THE INVENTION

Virtual operating systems have been used to provide security for computers by dividing computers into separate operational zones. By isolating processes in different zones within a computer system, a system, process, attacking user, etc. that obtains root access in one zone cannot in theory affect or even know about processes running in other zones in the computer. The "Solaris™ Zones" feature of the Solaris™ 10 operating system available from Sun Microsystems™ is an example of this approach. EMC™ Corporation's VMWare™ and other virtualization tools are further examples of technology for dividing a single computer into two or more virtual machines.

Figure 1:
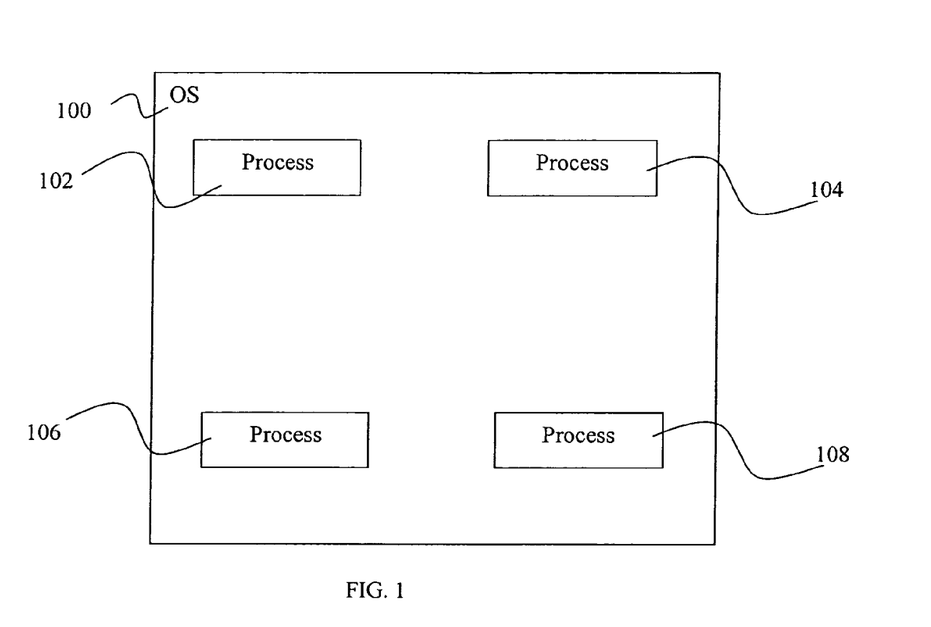
FIG. 1 illustrates a single operating system (OS) computer system.

FIG. 1 illustrates a computer system on which a single instance of an operating system (OS) is running. In the example shown, four processes are running under the control of OS 100: process 102, process 104, process 106, and process 108. The security problem is that a process might gain root access with respect to OS 100 and then be able to affect all processes and resources associated with OS 100.

Figure 2:
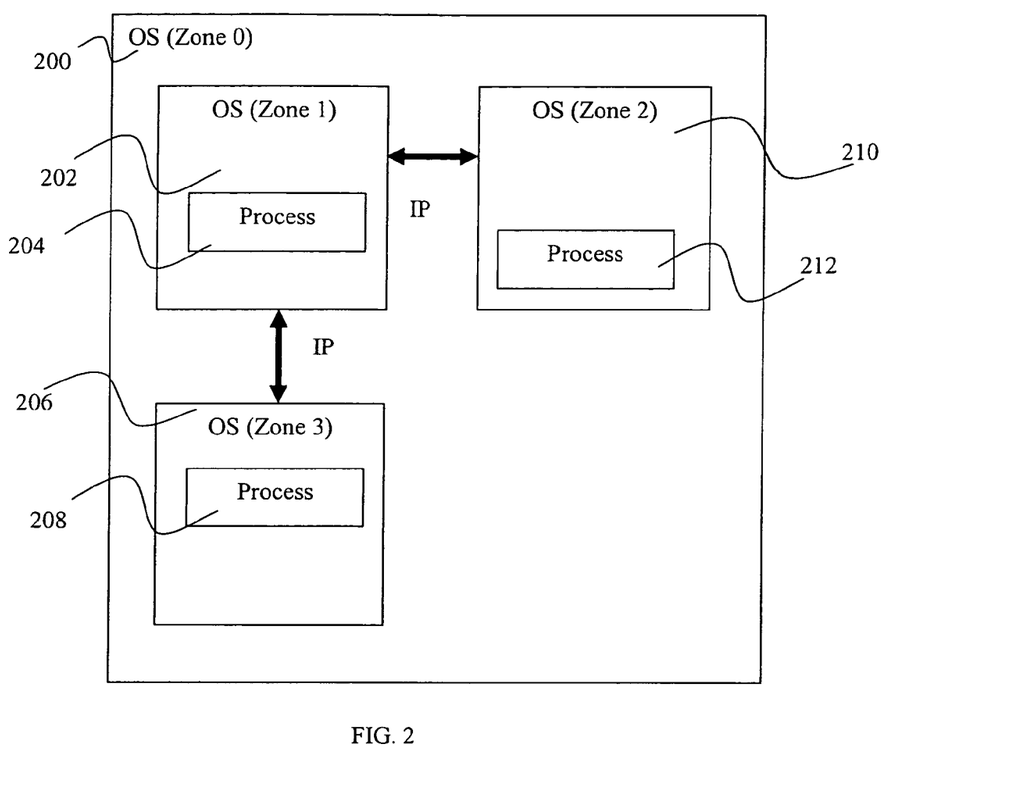
FIG. 2 illustrates a computer system with multiple virtual operating systems.

FIG. 2 illustrates a computer system with multiple zones. In the example shown, each of four zones has an instances of an operating system (OS) associated with it. In some implementations, each zone may be a virtualized runtime environment provided while running a single instance of the OS on the computer system, rather than literally running a separate instance of the OS for each zone. Under the control of OS (Zone 0) 200, self-contained subzones are defined. In the example shown, three virtual operating systems are running under the control of OS (Zone 0) 200: OS (Zone 1) 202, OS (Zone 2) 210, and OS (Zone 3) 206. Within each zone, one or more processes associated with the zone run under the control of the OS instance associated with that zone. In the example shown, process 204 is running under the control of OS (Zone 1) 202, process 212 is running under the control of OS (Zone 2) 210, and process 206 is running under the control of OS (Zone 3) 208. In the example shown, a single process is running within each zones, but more or fewer processes may be running with a zone at any given time. Within each virtual OS, the system appears to be a separate and entire computer system having its own IP address, network stack, file system, etc. If an unauthorized user uses a process operating in a given zone to gain root privileges in that zone, then although the unauthorized user can control other processes in that zone and resources associated with that zone, at least in theory the attacker would not be able to use root privileges obtained in one zone (other than the global zone, Zone 0 in the example shown in FIG. 2) to affect processes, access resources, and/or otherwise create mischief in other zones. For example, a user could configure the system shown in FIG. 2 to run a database in Zone 1, an application server in Zone 2, and a web server in Zone 3. If a process in zone 3, e.g., one associated with activities of an attacker connecting via the Internet to the web server running in Zone 3, breaches security and gains access to root, then there is at least in theory no way for that process to gain access to or control over the database running in Zone 1 and/or the application server running in Zone 2.

Even though in theory activities in a zone will be contained within that zone, there is a need to be able to detect any breakouts from a given virtual operating system, or zone, in order to assure security for the computer system.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Monitoring processes in order to determine if any processes has broken out of and/or is attempting to break out of a virtual operating system zone is disclosed. Breaking out of a zone, or breaching a zone, occurs, for example, when a process that was started within one zone at a later time operates or attempts to operate in another zone, such as by calling or attempting to call files, executables, DLL's, and/or other processes in a zone other than the zone in which the calling process was created. In one embodiment, a system call associated with a calling process that generated the system call is monitored. It is determined whether the system call stays within a zone in which the calling process was started. Responsive action is taken if it is determined that the system call does not stay within the zone in which the calling process was started.

Figure 3:
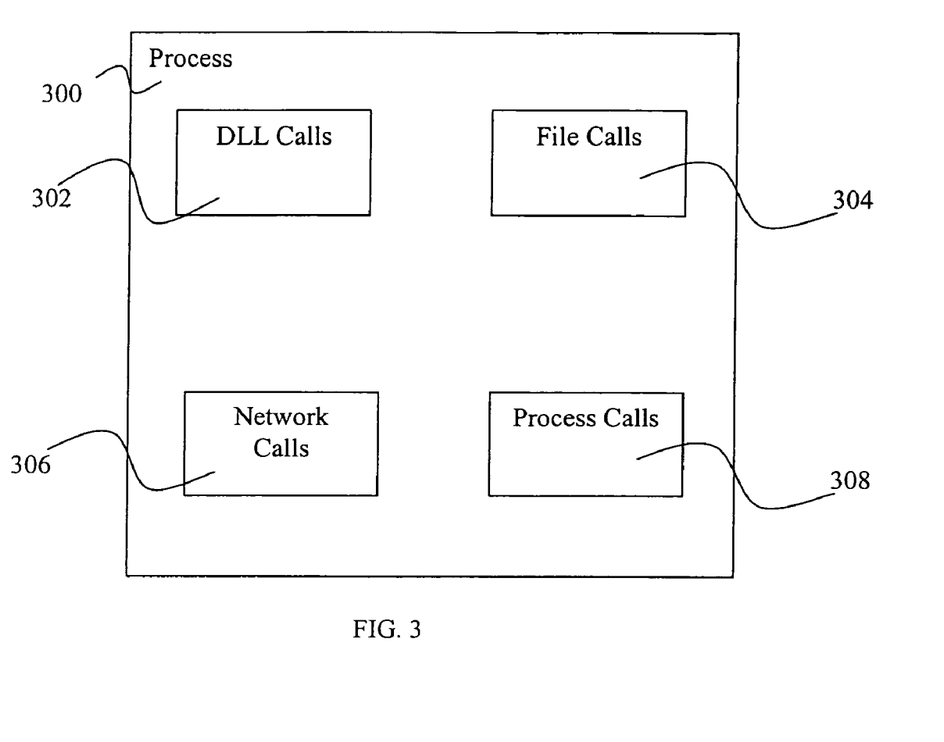
FIG. 3 illustrates the functions of a process.

FIG. 3 illustrates examples of system calls that may be generated by a process. Processes use system calls to invoke operating systems routines for performing various low-level operations. In some embodiments, process 300 is configured to generate system calls including the following types of calls: DLL calls 302, file calls 304, network calls 306, and process calls 308. DLL calls are calls to a dynamic link library. In some configurations a DLL call may be used to invoke a device driver. For example, a call to create a window on the screen uses a routine in a library that is dynamically linked with the process. File calls are calls to file functions. For example, a call to read and write to a hard drive of the system uses a file function call. Network calls are calls to network functions. For example, a call to read and write to a port that communicates with another computer uses a network call. Process calls are calls to launch a sub-process. In other embodiments, a process may make other types of system call, such as calls to executable files, programs, and/or modules.

Figure 4:
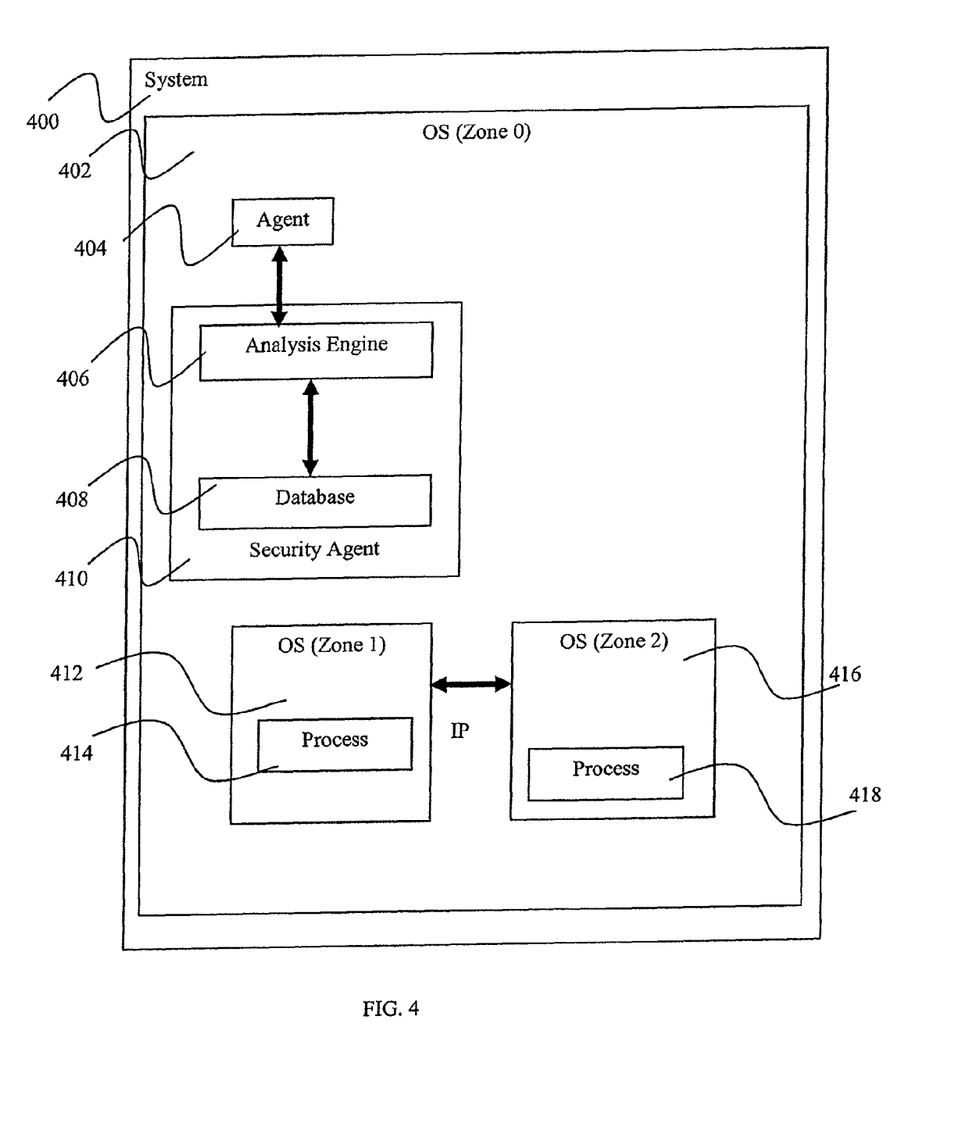
FIG. 4 illustrates a zone breakout detection security system.

FIG. 4 illustrates a system on which zone breakout detection has been implemented. On system 400, OS (Zone 0) 402 represents an instance of the operating system running in a global zone. OS (Zone 0) 402 has running in it additional zones OS (Zone 1) 412 and OS (Zone 2) 416. Agent 404 running in OS (Zone 0) 402 monitors processes running on system 400 (e.g., processes 414 and 418), including those that run in the virtual zones. In monitoring the processes, agent 404 monitors DLL calls, file calls, network calls, as well as calls to other processes. In one embodiment, agent 404 is intercepts system calls made by applications and/or other processes in the OS kernel of system 400 (and/or the kernel of each actual and/or virtual instance of the OS). In one embodiment, agent 404 is configured to provide to one or more security processes (see, e.g., FIGS. 5 and 6) a copy of system calls made by applications and/or other processes. Agent 404 reports information to security agent 410. In one embodiment, security agent 410 comprises an application and/or process running in Zone 0, as shown in FIG. 4. In other embodiments, security agent 410 may be a device (e.g., application specific integrated circuit) associated with system 400; a process running on system 400 but not in Zone 0; or a device, system, or process separate from system 400. Analysis engine 406 in security agent 410 takes reported information and, using information in database 408, determines whether a process has breached (or is attempting to breach) a zone area as evidenced by the process taking or attempting to take action in a zone other than the zone in which the process was started, such as by starting (or calling) or attempting to start (or call) a process in another zone and/or accessing or attempting to access a resource associated with such other zone, e.g., a file. In some embodiments, the determination of whether a process has breached a zone includes examining the starting zone for the processes and the zone information associated later with the processes and determining if the starting zone and later zone are the same. In one embodiment, to facilitate such comparison database 408 is configured to store data associating each process running on system 400 with a zone in which the process was started. Maintaining a database of such information that is separate from data available from the OS running in Zone 0 makes it possible to detect zone breakouts reliably even in the face of obfuscation attempts. For example, an attacker might attempt to evade detection of a zone breakout by changing in a data repository maintained by the OS and/or an application or process being used to provide additional zones within the global zones an entry associated with the process being used to break out of a zone in which the process was created to cause the process to be associated on system 400 with the target zone instead of the zone in which it was originally created.

Figure 5:
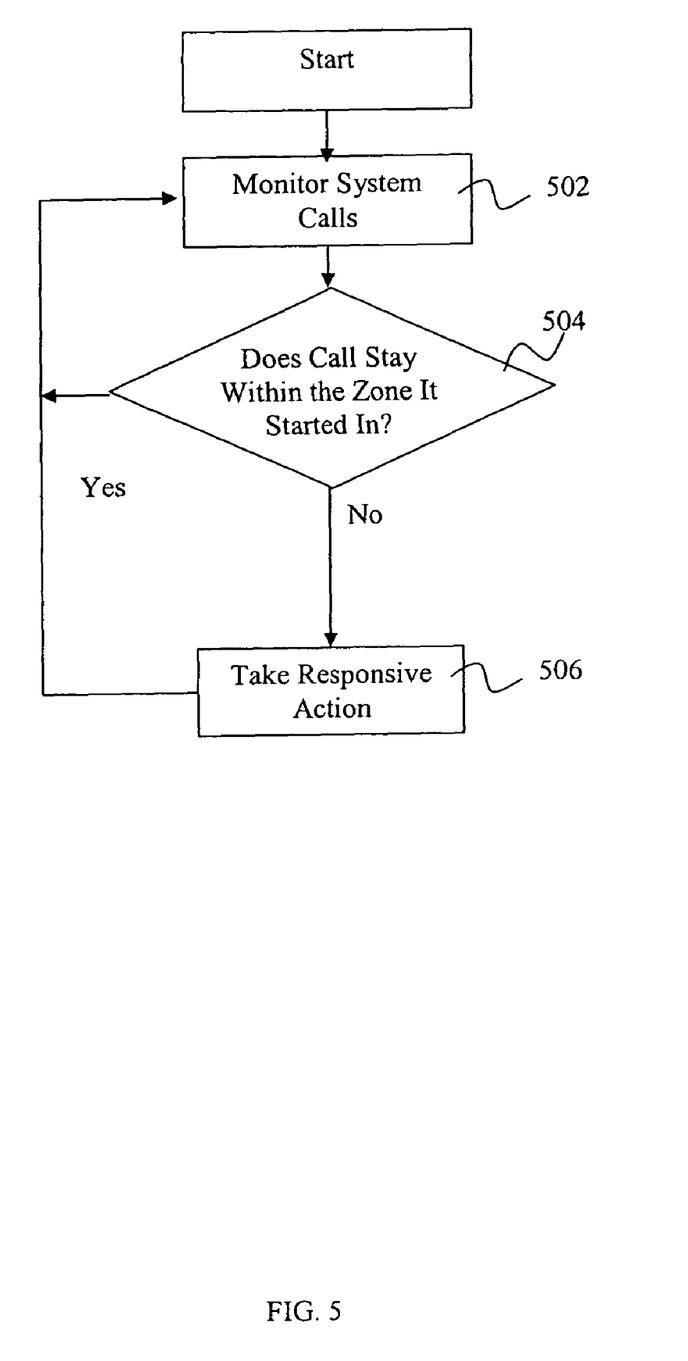
FIG. 5 illustrates the overall method for determining if a process has breached a zone area.

FIG. 5 illustrates a process used in one embodiment to detect a zone breakout. In 502, system calls of a process are monitored. In some embodiments, all system calls generated by any process are monitored. In some embodiments, the system calls are executable calls, DLL calls, file calls, network calls, or calls to other processes. In 504, it is determined whether the system call stays within the zone in which the process that generated the call started. If the system call remains in the zone in which the process that generated the system call started, the process returns to 502. If not, responsive action is taken in 506. In some embodiments, the responsive action depends on the zones involved. In some embodiments, the responsive action depends on the type of action taken by a process in a zone other than the zone in which it was created. For example, in one embodiment, a process that started in the global zone (Zone 0) that gains access to a less critical sub-zone (e.g., Zone 1) may result in an alert being sent or an event being logged, whereas a process that breaks out of a sub-zone (e.g., Zone 1) and gains root privileges in the global zone (Zone 0) may result in more aggressive responsive action, such as shutting down the offending process, blocking communications from a remote user associated with the offending process, etc. In some embodiments, the responsive action may include logging the zone breakout, alerting the system to the zone breakout, and/or making a recommendation that the system terminate the process that has breached a zone depending on such factors as the originating and/or destination zone, the level of privileges acquired in the destination zone, the criticality of the data, processes, etc. of the destination zone, etc.

In certain of the embodiments described in detail herein system calls such as executable calls, DLL calls, file calls, and network calls are described. However, the approaches described herein for detecting zone breakouts may be applied as well to other types of system call and/or to other types of operations by which an attempt may be made to break out of a zone.

Figure 6:
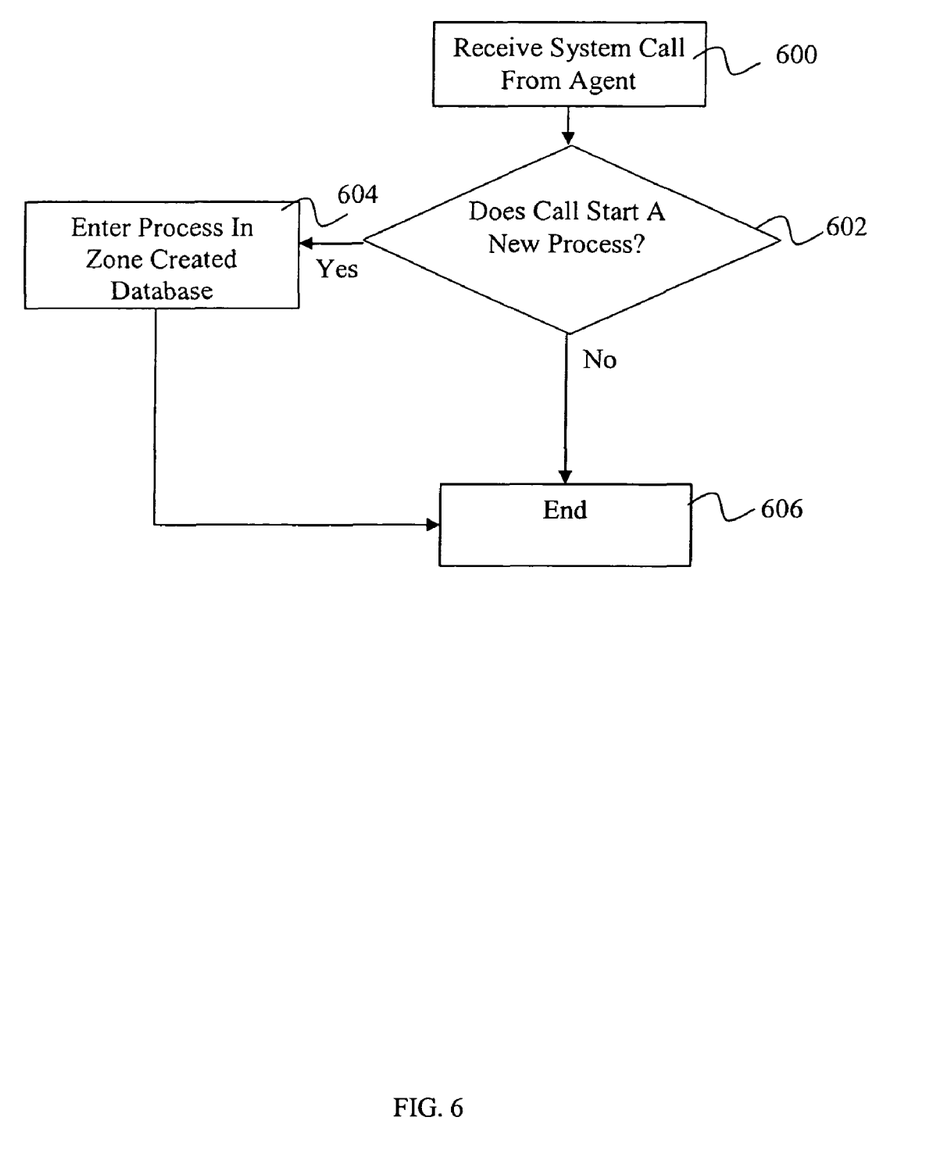
FIG. 6 illustrates the monitoring of process calls that call another process.

FIG. 6 illustrates a process used in one embodiment to track the zone in which each process running on a system was launched. In 600, an intercepted system call is received. In 602, it is determined if the system call launches a new process. If not, monitoring ends in 606. If the system call launches a new process, in 604, the process and the zone in which it was started are entered in a "zone created" database of information used to keep track, apart from the data repositories normally maintain by the OS and/or system being monitored, of the zone in which each process running on the system was launched. In one embodiment, a separate process, not shown in FIG. 6, is used to purge from the "zone created" database data associated with processes that have terminated.

Figure 7:
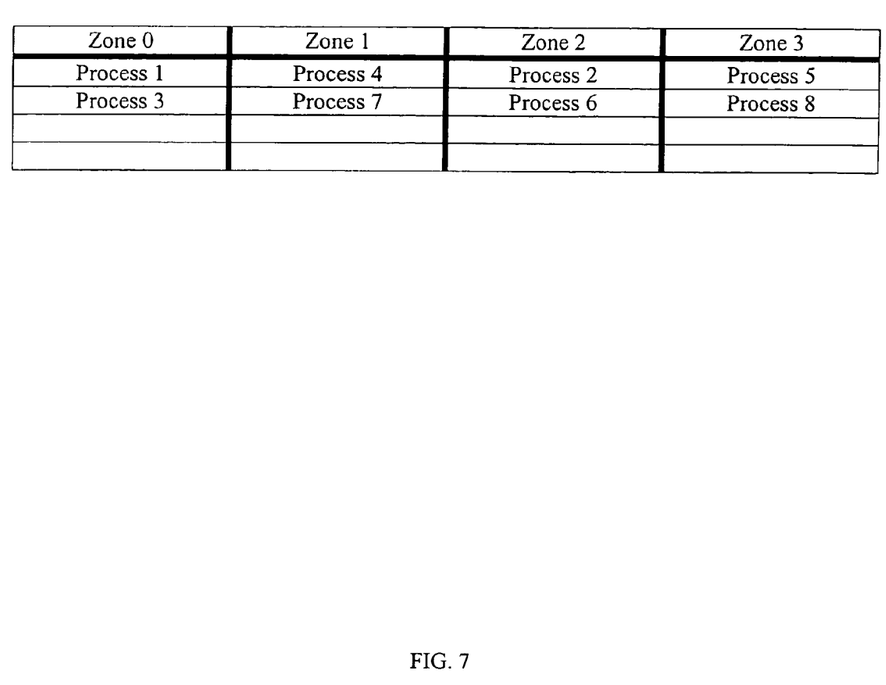
FIG. 7 illustrates a zone created database in one embodiment.

FIG. 7 illustrates a zone created database used in one embodiment. Each process created is stored in the column indicating which zone the process was created in. Process 1 and Process 3 are listed as having been created in zone 0. Process 4 and process 7 are listed as having been created in zone 1. Process 2 and process 6 are listed as having been created in zone 2. And, process 5 and process 8 are listed as having been created in zone 3. In one embodiment, the zone created database of FIG. 7 is maintained separately from data repositories associated with the OS, to ensure the true zone in which each process was created is known, even if an attacker modifies information about a process in one or more files and/or data repositories associated with the OS in which such information normally is tracked. In one embodiment, 604 of FIG. 6 comprises making an entry in a table such as the one shown in FIG. 7. In one embodiment, 504 of FIG. 5 comprises checking a table such as the one shown in FIG. 7 to determine the zone in which a process that generated an intercepted (or otherwise monitored) system call was started.

Figure 8:
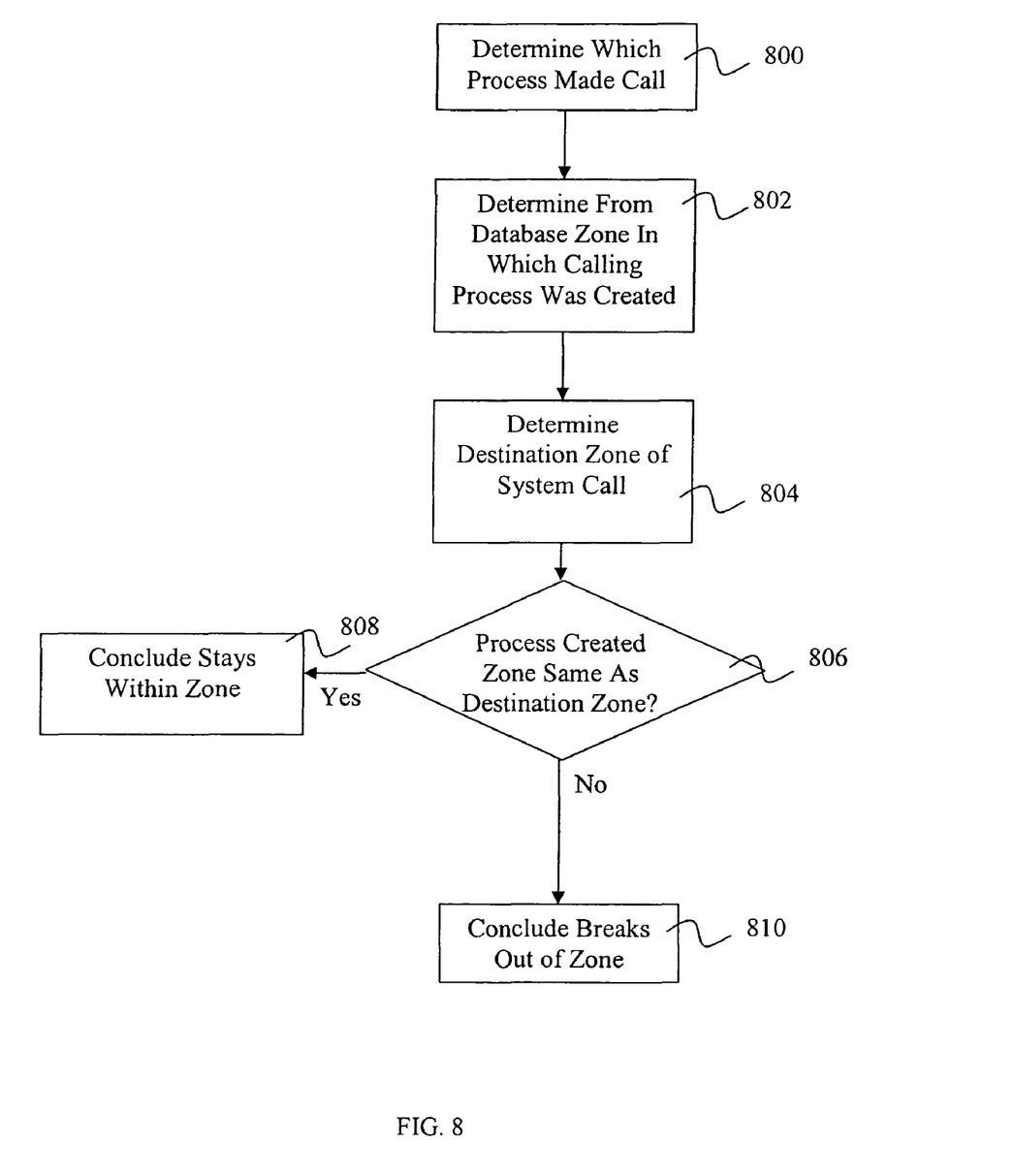
FIG. 8 illustrates the determination of whether a process has stayed within a zone in one embodiment.

FIG. 8 illustrates a process using in one embodiment to determine whether a destination zone associated with a system call is the same as the zone in which the process that generated the system call was started. In one embodiment, the process of FIG. 8 is used to implement 504 of FIG. 5. In 800, it is determined which process made the system call being processed. In 802, by looking at the zone created database, the zone in which the process that generated the system call was created is determined. In 804, the destination zone with which the system call is associated is determined. In one embodiment, the destination zone comprises the zone in which the system call does or attempts to start, stop, and/or interact with a process running in the zone and/or to access, modify, and/or otherwise interact with a resource (e.g., file) associated with the zone. In 806, it is determined if the calling process that generated the system call was created in the same zone as the destination zone associated with the system call. If the process was created in the same zone as the destination zone associated with the system call, in 808, it is concluded that no zone breakout has occurred (or been attempted, depending on the configuration and/or embodiment). If not, in 810, it is concluded that a zone breakout has occurred (or been attempted).

Figure 9:
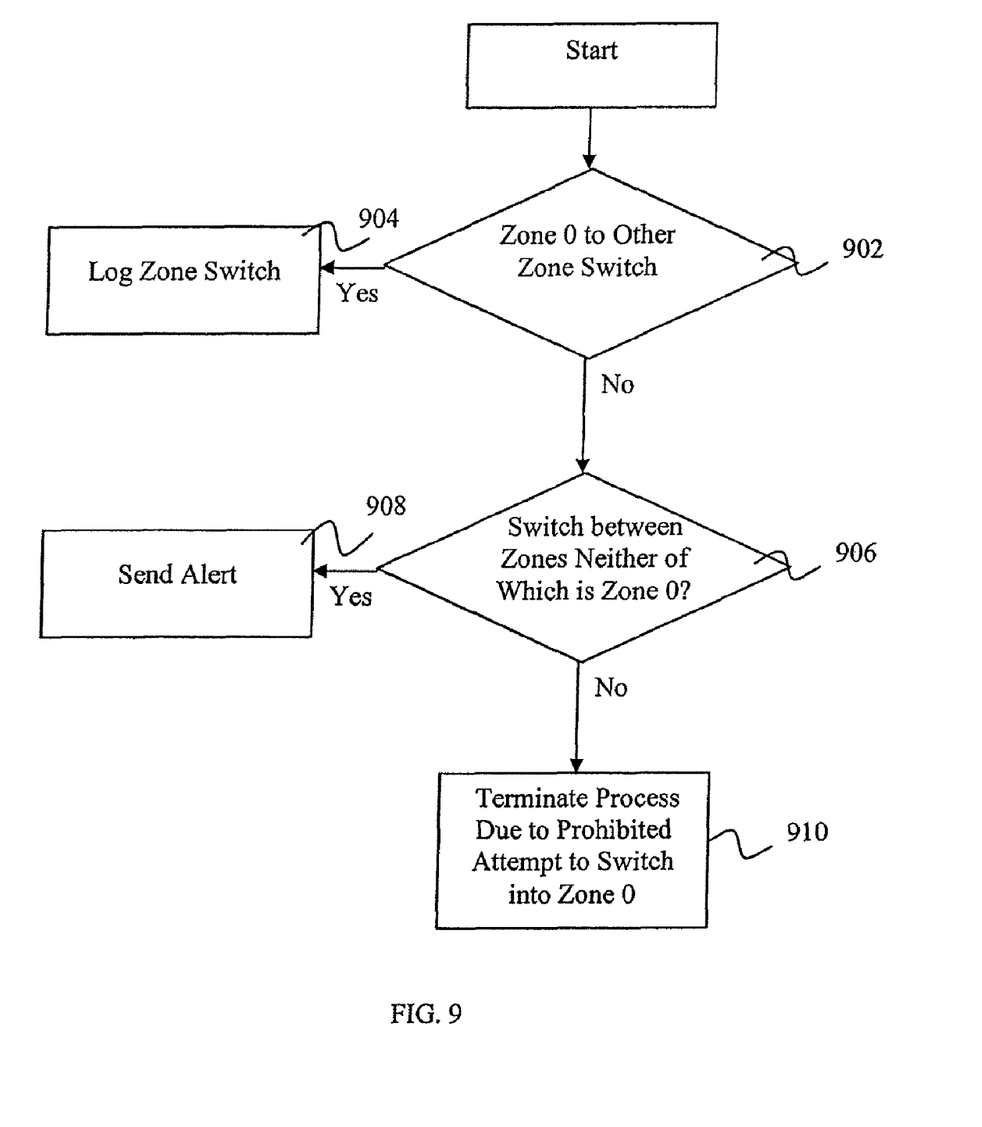
FIG. 9 illustrates the action taken if a process has broken out of a zone.

FIG. 9 illustrates the responsive action taken in one embodiment if an actual and/or attempted zone breakout is detected. In one embodiment, the process of FIG. 9 is used to implement 506 of FIG. 5. In 902, it is determined if the zone breakout was from zone 0 to another zone. If the zone breakout was form zone 0 to another zone, in 904, the zone breakout is logged. If not, in 906, it is determined if the zone breakout was from a zone other than zone 0 to another zone other than zone 0. If the zone breakout was from a zone other than zone 0 to another zone other than zone 0, in 908, an alert is sent. If not, then it is concluded in 910 that the zone break out was from a zone other than zone 0 to zone 0 (the only remaining possibility) and the process that generated the call is terminated. In one alternative embodiment, the offending process is not terminated immediately in 910 and instead a recommendation that the offending process be terminated is generated. The particular responsive actions described herein in connection with 904, 908, and 910 are merely illustrative and any appropriate responsive action(s) may be taken in response to a detected actual and/or attempted zone breakout.

In one embodiment, system calls are intercepted and are not forwarded for processing if it is determined that the system call would result in a zone breakout. In one embodiment, system calls are intercepted but are only blocked in the event of certain types of zone breakout, such as from a zone other than zone 0 into zone 0 (i.e., into the global zone).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for detecting a zone breakout comprising:
receiving a system call associated with a process, wherein the system call comprises at least one of an attempted system call and an actual system call;
determining if the process with which the system call is associated is a new process;
determining a first zone in which the process was started;
if it is determined the process is a new process, storing information that identifies the new process as having been started in the first zone in a database of process zone information;
determining a second zone with which the system call is associated;
maintaining the database of process zone information containing zone starting information and subsequent zone information associated with the new process, wherein the database is maintained outside of a global zone containing the first and second zones, and wherein the database stores the information identifying the new process;
determining if the first zone is different from the second zone based at least in part on the stored information; and
taking responsive action if it is determined that the first zone is different from the second zone, wherein the responsive action comprises:
blocking the system call if the second zone is associated with higher privileges than the first zone and the system call is an attempted system call;
terminating the process if the second zone is associated with higher privileges than the first zone and the system call is an actual system call; and
maintaining a separate process to purge data associated with the terminated process from the database.

2. The method as in claim 1 wherein the system call is an executable call.

3. The method as in claim 1 wherein the system call is an executable call and wherein determining whether the system call is associated with the second zone includes determining whether an executable file associated with the executable call is associated with the second zone.

4. The method as in claim 1 wherein the system call is a file call.

5. The method as in claim 1 wherein the system call is a file call and wherein determining whether the system call is associated with the second zone includes determining whether a file associated with the file call is associated with the second zone.

6. The method as in claim 1 wherein the system call is a process call.

7. The method as in claim 1 wherein the system call is a process call and wherein determining whether the system call is associated with the second zone includes determining whether the process call includes an attempt to start a target process in the second zone.

8. The method as in claim 1 wherein the system call is a network call.

9. The method as in claim 1 wherein the system call is a network call and wherein determining whether the system call is associated with the second zone includes determining whether the network call is associated with the second zone.

10. The method as recited in claim 1 wherein the system call is a DLL call.

11. The method as in claim 1 wherein the process comprises the process that generated the system call.

12. The method as in claim 1 wherein the responsive action further comprises logging zone switching information if the first zone is associated with higher privileges than the second zone.

13. The method as in claim 1 wherein the responsive action further comprises sending an alert if the first zone is associated with similar privileges as the second zone.

14. The method as in claim 1 wherein the responsive action further comprises providing a recommendation to terminate the process.

15. The method as in claim 1 wherein the responsive action further comprises terminating the process automatically.

16. The method as in claim 1 wherein the responsive action further comprises sending an alert if the first zone and the second zone are sub-zones associated with lower privileges than the global zone of which the first zone and the second zone are a part.

17. The method of claim 1, further comprising:
blocking communications from a remote user associated with the offending process in the event data of the second zone is of a specified level of criticality.

18. The method of claim 1, wherein the database comprises a database maintained by one or more of: a device separate from the system being monitored, a system separate from the system being monitored, and a process separate from the system being monitored.

19. The method of claim 1, further comprising specifying a type of zone breakout for which associated system calls are blocked.

20. A device for detecting a zone breakout comprising:
an analysis engine configured to:
receive a system call associated with a process, wherein the system call comprises at least one of an attempted system call and an actual system call;
determine if the process with which the system call is associated is a new process;
determine a first zone in which the process was started;
if it is determined the process is a new process, store information that identifies the new process as having been started in the first zone in a database of process zone information;
determine a second zone with which the system call is associated;
determine if the first zone is different from the second zone based at least in part on the stored information;
take responsive action if it is determined that the first zone is different from the second zone, wherein the responsive action comprises:
blocking the system call if the second zone is associated with higher privileges than the first zone and the system call is an attempted system call;
terminating the process if the second zone is associated with higher privileges than the first zone and the system call is an actual system call;
maintaining a separate process to purge data associated with the terminated process from the database of process zone information; and
a memory storing the database of process zone information, the database of process zone information storing starting information and subsequent zone information associated with the new process, wherein the database is maintained outside of a global zone containing the first and second zones and wherein the database stores the information identifying the new process.

21. A computer program product for detecting a zone breakout, the computer program product being embodied in a non-transitory computer readable storage medium and comprising computer instructions for:
receiving a system call associated with a process, wherein the system call comprises at least one of an attempted system call and an actual system call;
determining if the process with which the system call is associated is a new process;
determining a first zone in which the process was started;
if it is determined the process is a new process, storing information that identifies the new process as having been started in the first zone in a database of process zone information;
determining a second zone with which the system call is associated;
maintaining the database of process zone information containing zone starting information and subsequent zone information associated with the new process, wherein the database is maintained outside of a global zone containing the first and second zones, and wherein the database stores the information identifying the new process;
determining if the first zone is different from the second zone based at least in part on the stored information;
taking responsive action if it is determined that the first zone is different from the second zone, wherein the responsive action comprises:
blocking the system call if the second zone is associated with higher privileges than the first zone and the system call is an attempted system call;
terminating the process if the second zone is associated with higher privileges than the first zone and the system call is an actual system call; and
maintaining a separate process to purge data associated with the terminated process from the database.

* * * * *